United States Patent
Bshara et al.

(10) Patent No.: US 12,487,846 B1
(45) Date of Patent: Dec. 2, 2025

(54) BONDING MULTIPLE PERIPHERAL PORTS TO A SINGLE VIRTUAL MACHINE

(71) Applicant: Amazon Technologies, Inc., Seattle, WA (US)

(72) Inventors: Said Bshara, Tira (IL); Evgeny Schmeilin, Haifa (IL); Filippo Sironi, Dresden (DE); Benjamin Serebrin, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 543 days.

(21) Appl. No.: 18/067,444

(22) Filed: Dec. 16, 2022

(51) Int. Cl.
*G06F 9/455* (2018.01)
*G06F 13/42* (2006.01)

(52) U.S. Cl.
CPC ...... *G06F 9/45558* (2013.01); *G06F 13/4221* (2013.01); *G06F 2009/45579* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 12,271,322 B2 * | 4/2025 | Kachare | G06F 13/4027 |
| 2013/0091310 A1 * | 4/2013 | Caballero | G06F 9/546 710/62 |
| 2013/0160002 A1 * | 6/2013 | Graham | G06F 9/45558 718/1 |
| 2018/0349161 A1 * | 12/2018 | Jain | G06F 9/45537 |
| 2019/0042508 A1 * | 2/2019 | Raghav | G06F 13/4282 |
| 2020/0401751 A1 * | 12/2020 | Kachare | G06F 13/105 |
| 2022/0066807 A1 * | 3/2022 | Kashyap | G06F 3/0604 |
| 2024/0143526 A1 * | 5/2024 | Liss | G06F 13/28 |

* cited by examiner

*Primary Examiner* — Mustafa A Amin
(74) *Attorney, Agent, or Firm* — Weaver Austin Villeneuve & Sampson LLP (57) ABSTRACT

An input/output (I/O) device is coupled to a processor via a first peripheral bus and a second peripheral bus. The I/O device is configured to expose a first physical function (PF) and a second PF to a virtual machine (VM) executing on the processor. A first virtual function (VF) associated with the first PF is assigned to the first peripheral bus, and a second VF associated with the second PF is assigned to the second peripheral bus. The first VF and the second VF are exposed as a single VF to the VM. The VM can perform transactions with the I/O device via the single VF using the first peripheral bus and the second peripheral bus.

21 Claims, 6 Drawing Sheets

BONDING MULTIPLE PERIPHERAL PORTS TO A SINGLE VIRTUAL MACHINE

BACKGROUND

Some input/output (I/O) devices that use a Peripheral Component Interconnect express (PCIe) bus to communicate with a host processor may include single-root input output virtualization (SR-IOV) capability that can allow a physical resource to appear as multiple resources. The functions of an SR-IOV-capable device may be classified as physical functions or virtual functions. Physical functions are fully featured functions of the device that can be discovered, managed, and manipulated. Physical functions have configuration resources that can be used to configure or control the I/O devices. Physical functions include the same configuration address space and memory address space that a non-virtualized device would have. A physical function may have a number of virtual functions associated with it.

BRIEF DESCRIPTION OF THE DRAWINGS

Various embodiments in accordance with the present disclosure will be described with reference to the drawings, in which.

DETAILED DESCRIPTION

Some computing systems may include host devices that communicate with input/output (I/O) devices using one or more Peripheral Component Interconnect express (PCIe) buses. The I/O devices may include network devices (e.g., Ethernet Controllers), storage device controllers (e.g., SSD controllers), accelerators, etc. In some examples, an I/O device that includes a PCIe interface is also called a PCIe device. Some I/O devices with single-root I/O virtualization (SR-IOV) capability can enable a Single Root Function (e.g., a single Ethernet port), to appear as multiple, separate, physical devices. A physical device with SR-IOV capabilities can be configured to appear in the PCIe configuration space as multiple functions that can include physical functions (PFs) and virtual functions (VFs). Each PF and VF can have its own PCIe configuration space. The VFs may appear as PCIe devices with assigned resources such as queues and register sets on the physical PCIe device.

A hypervisor executing on the host device can assign one or more VFs to a guest virtual machine (VM) executing on the host device. The configuration space of the VF can be assigned to the configuration space presented to the guest VM (also called an instance). In most implementations, a VM can have multiple VFs, however, each VF can only be assigned to a single VM. The VF can be assigned to the guest VM as a physical device using PCIe device assignment (sometimes referred to as passthrough), which can improve the performance of the VM. For example, the hypervisor may assign the VFs to the VMs using a PF device driver, and the VFs can use their local VF device drivers to communicate with the I/O device directly. In some examples, the I/O device may be operable to deliver more bandwidth than the bandwidth of the PCIe bus. For example, the I/O device can be a network device that can support up to 2×1000 Gbps aggregate bandwidth of Ethernet ports, which is more than the bandwidth of a single PCIe bus (e.g., close to 170 Gbps). In some implementations, the I/O device may support multiple PCIe ports, but each PCIe port may be mapped to a different VM since VFs associated with each PF are bound to a specific PCIe port. Thus, achieving higher bandwidth may require more than one VF to be assigned to the VM, which may require changes in the VM or the VF device driver executing in the VM.

Techniques described herein can be used to achieve higher bandwidth for I/O data transfers for a single VM using multiple peripheral buses without the knowledge of the VM or the VF device driver by exposing the VFs assigned to the multiple peripheral buses as a single VF to the VM. The I/O device may be configured to communicate with a host device using multiple peripheral buses based on a suitable bus protocol, e.g., PCIe, or Compute Express Link (CXL), among others. For example, the I/O device may be coupled to a host processor in the host device via multiple PCIe buses, and a first virtual function (VF1) can be assigned to a first PCIe bus and a second virtual function (VF2) can be assigned to a second PCIe bus. Both the VF1 and the VF2 can be mapped to an address space allocated to the VM. Each of the VF1 and VF2 may include their respective configuration space, and memory space for the queues and registers. The hypervisor executing on the host processor may mirror the configurations between the VF1 and VF2, which may be exposed as the configuration of the single VF presented to the VM, and can enable identical behavior by both the VF1 and the VF2 towards the VM. Similarly, message signaled interrupts (e.g., MSIs or MSIs-X) for each of the VF1 and VF2 can also be mirrored to trigger the same interrupt to the VM. Thus, the VM can communicate with the I/O device via the single VF to perform transactions using the first PCIe bus and the second PCIe bus to achieve higher bandwidth without any changes on the VM side.

The VF1 may include a first set of configuration registers and a first set of queues that are associated with the first PCIe bus, and the VF2 may include a second set of configuration registers and a second set of queues that are associated with the second PCIe bus. The first set of configuration registers and queues, and the second set of configuration registers and queues can be mapped to the address space allocated to the VM. The I/O device can be configured to maintain ordering of the packets for the same transaction by assigning the same PCIe bus/port for transferring the packet payloads, completion descriptors, and the interrupts. For example, specific queues are assigned to each PCIe bus, and packets belonging to the same queue are transferred on the assigned PCIe bus.

In other words, packets belonging to the same flow will be transferred on the same PCIe bus.

In some embodiments, the first set of queues may include a first set of sub-completion queues to track the completion messages for the packets sent out via the first set of queues, and the second set of queues may include a second set of sub-completion queues to track the completion messages for the packets sent out via the second set of queues. In some embodiments, a first I/O memory management unit (IOMMU) coupled to the I/O device via the first PCIe bus can be configured to translate addresses of transactions processed by the first set of queues to physical addresses associated with the VM, and a second IOMMU coupled to the I/O device via the second PCIe bus can be configured to map the addresses of the transactions processed by the second set of queues to physical addresses associated with the VM. Thus, bonding the first set of queues for the VF1 and second set of queues for the VF2 to the first PCIe bus and the second PCIe bus, respectively, can maintain the ordering of the packets for a given transaction, while achieving higher bandwidth using multiple PCIe buses.

Similarly, data transfer performed for the egress traffic of the I/O device may include multiple read operations of the system memory using the first PCIe bus and the second PCIe bus. In this case, ordering of the packets can be maintained inherently by using the first set of queues associated with the first PCIe bus and the second set of queues associated with the second PCIe bus. The read operations can be performed from the system memory via the first PCIe bus and the second PCIe bus using the respective physical memory addresses translated by the first IOMMU and the second IOMMU from the virtual addresses associated with the VF1 and VF2.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

Figure 1:
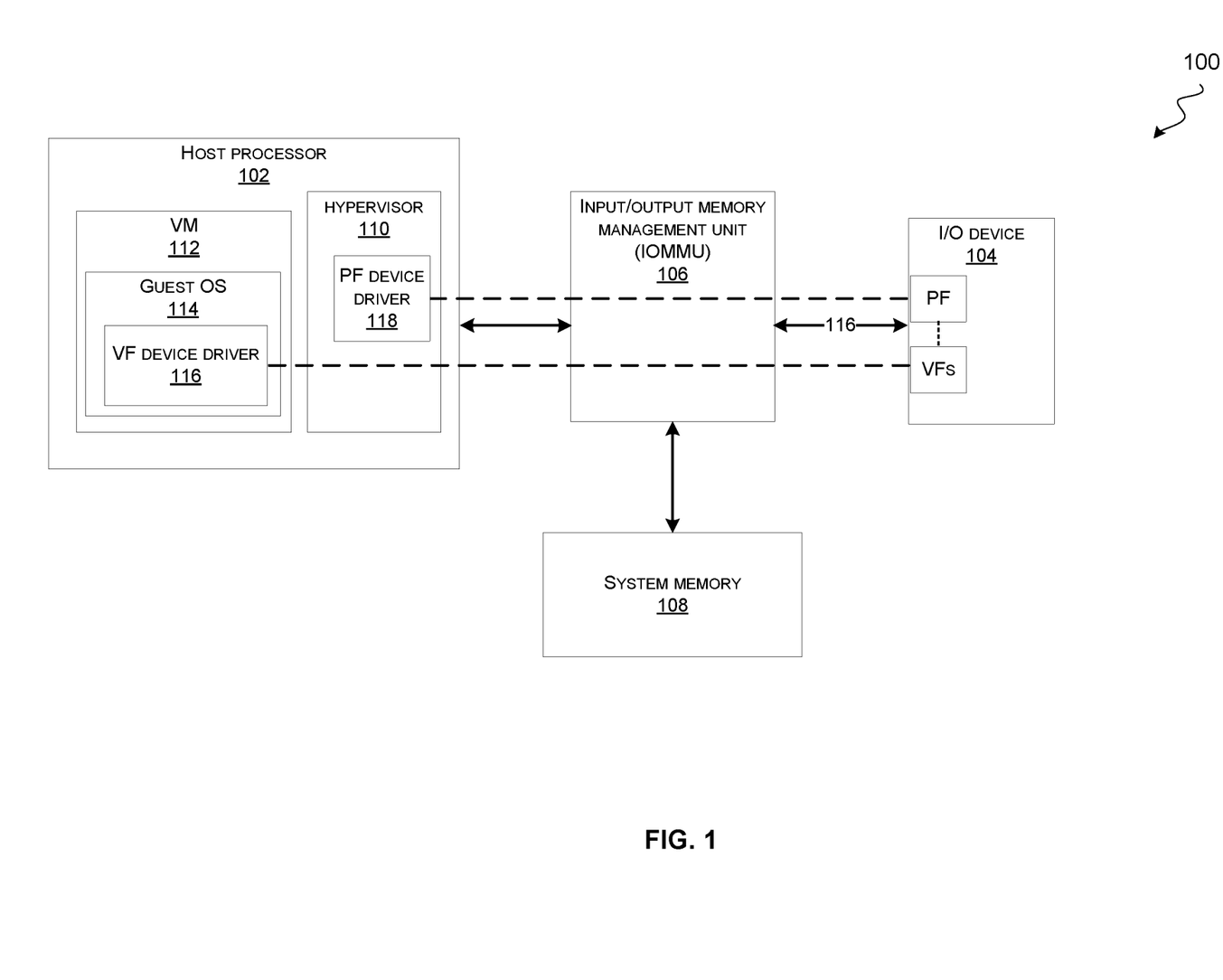
FIG. 1 illustrates an example computing system that can support input/output (I/O) virtualization.

FIG. 1 illustrates an example computing system 100 that can support input/output (I/O) virtualization.

The computing system 100 may include a host processor 102 that may be configured to communicate with an I/O device 104 using a PCIe interface 116 in a virtualized environment. The I/O device 104 may be memory mapped into an address space of the host processor 102. An I/O memory management unit (IOMMU) 106 may be configured to provide mapping between the device addresses associated with the I/O device 104 and physical memory addresses associated with a system memory 108. The host processor 102 may also be configured to execute a virtual machine (VM) 112 that may be executing a guest operating system (OS) 114. A plurality of such VMs may be running on the host processor 102 that may be associated with different processes/threads/user applications. A hypervisor 110 executing on the host processor 102 may have the capability to configure and manage the VMs based on the applications.

The I/O device 104 may be configured to perform I/O transactions with the one or more VMs 112 executing on the host processor 102. For example, the hypervisor 110 can allocate an address space to the VM 112, some of which may be mapped to the I/O device 104 and the system memory 108. In various examples, the I/O device 104 can be a network device that can provide connectivity to the network (e.g., via Ethernet ports), or a storage interface device that can provide access to a storage device (e.g., via nonvolatile memory express (NVMe)). In some examples, the I/O device 104 can be a cryptographic accelerator, a neural network accelerator, a graphics processing unit (GPU), or any other suitable PCIe device.

The I/O device 104 may include single-root I/O virtualization (SR-IOV) capability that can allow a physical resource on the I/O device 104 (e.g., a single Ethernet port) to appear as multiple resources (e.g., multiple Ethernet ports). The SR-IOV capability can allow the I/O device 104 to separate access to its resources among various PCIe hardware functions that may include a PF, and one or more VFs associated with the PF. Each VF may represent a virtualized instance of the I/O device 104 with assigned resources such as queues and register sets on the physical PCIe device, which are in PCIe memory space. Each VF may share one or more resources on the I/O device 104 with other VFs and the PF. Each of the PF, and the VFs may include dedicated configuration space on the I/O device, which can be programmed by the hypervisor 110. For example, a PF device driver 118 in the hypervisor 110 may configure and provision the VFs, as well as assign and manage resources on the I/O device 104. Each VF assigned to the VM 112 can be managed by a VF device driver 116 executing on the VM 112, and can facilitate direct data transfer (e.g., passthrough) between the VM 112 and the I/O device 104 using the queues and the register sets associated with the VF.

The IOMMU 106 may be configured to remap direct memory access (DMA) transactions that include virtual addresses associated with the VM 212 into physical addresses associated with the system memory 108. For example, DMA transactions issued by the VM 112 to transfer data to or from the system memory 108 may include guest OS physical addresses or guest OS virtual addresses, which can be translated by the IOMMU 106 to the host physical addresses. The IOMMU 106 may also be configured to remap the device interrupts to the appropriate VMs. Each PF and the VF can be assigned a unique PCIe requester identifier (ID) that can allow the IOMMU 106 to differentiate between different traffic flows and apply memory and interrupt translations between the PFs and the VFs. In some implementations, each requester ID may include a corresponding Bus/Device/Function (B/D/F) associated with the PCIe bus 116.

In some implementations, the I/O device 104 may be operable to deliver more bandwidth than the bandwidth of the PCIe bus 116. For example, the I/O device 104 can be a network device that can support up to 2×1000 Gbps aggregate bandwidth of Ethernet ports, which is more than the bandwidth of the single PCIe bus 116 (e.g., approximately 170 Gbps). In some implementations, the I/O device 104 may support multiple PCIe ports, but each PCIe port may be mapped to different VMs since VFs associated with each PF are bound to a specific PCIe port. Thus, achieving higher bandwidth may require changes in the code for the VM 112 and the VF device driver 116 to be able to operate on multiple PCIe ports, which may not be a desirable option.

Techniques described herein can be used to achieve higher bandwidth for I/O transactions using multiple PCIe buses by bonding the VFs in the I/O device to corresponding PCIe buses, and exposing the VFs as a single VF to the VM without the knowledge of guest OS or the VF device driver executing in the VM. Each VF can be assigned respective memory mapped IO regions (MMIO), message signaled interrupts (MSIs) and its extension tables (MSI-X) in the address space allocated to the VM. This is further described with reference to FIG. 2.

Figure 2:
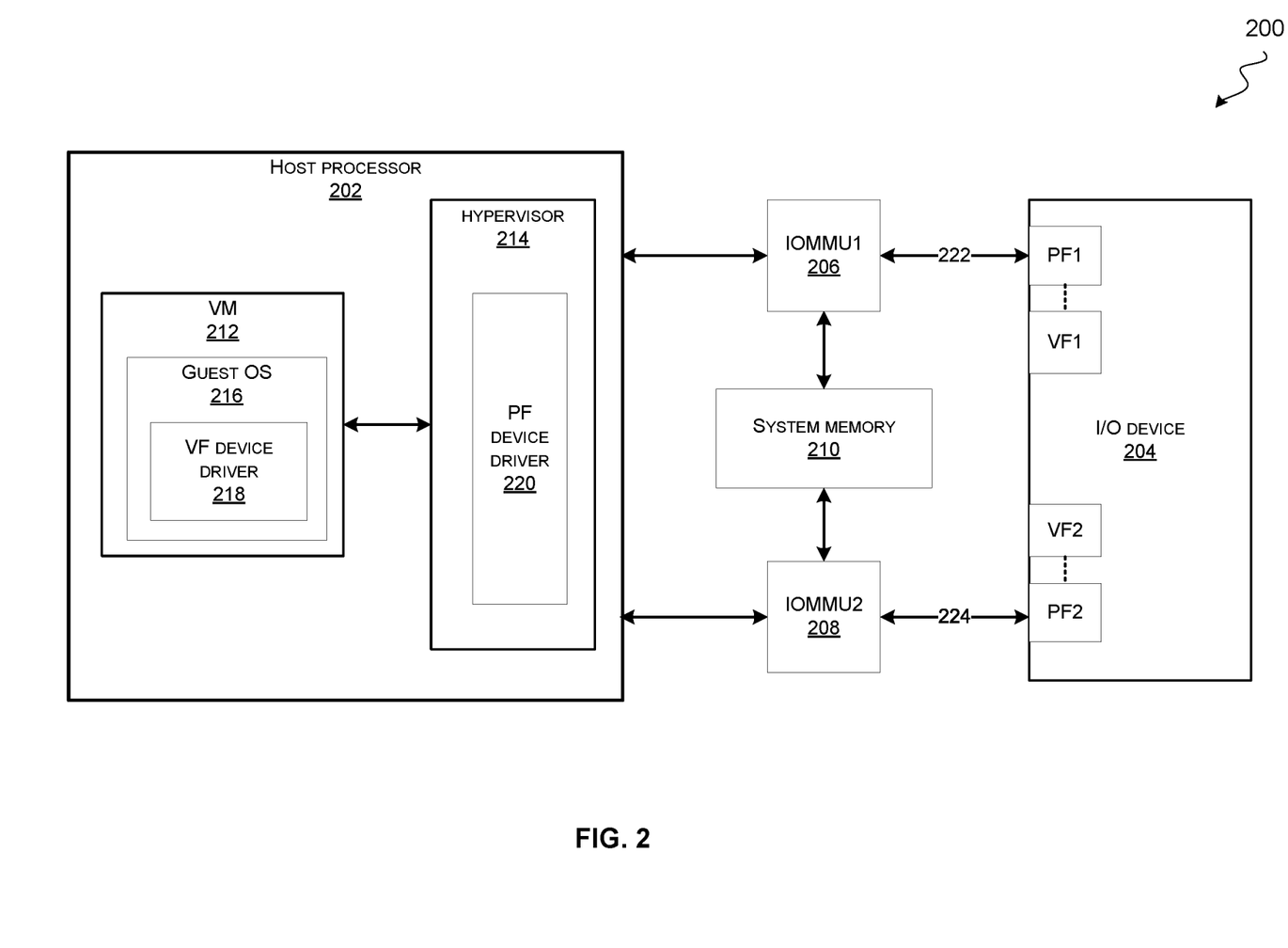
FIG. 2 illustrates an example computing system that can be configured to bond multiple peripheral ports of an I/O device to a single virtual machine, according to some embodiments.

FIG. 2 illustrates an example computing system 200 that can be configured to bond multiple peripheral ports of an I/O device to a single VM, according to some embodiments.

The computing system 200 may include a host processor 202 configured to execute a VM 212 that may be executing a guest OS 216. The host processor 202 may be configured to communicate with an I/O device 204 using multiple peripheral buses. For example, the host processor 202 may communicate with the I/O device 204 using a first PCIe bus 222, and a second PCIe bus 224. The host processor 202 may allocate an address space to the VM 212. A portion of the address space allocated to the VM 212 may be mapped to a system memory 210 and another portion may be mapped to the I/O device 204. An IOMMU1 206 and an IOMMU2 208 may be configured to perform respective translations for transactions between the I/O device 204 and the system memory 210 via the first PCIe bus 222 and the second PCIe bus 224. Note that the computing system 200 may include other components based on the functionality supported by the computing system 200, which are not shown here for ease of description.

The I/O device 204 may include SR-IOV capability to allow a physical resource on the I/O device 204 to appear as multiple resources. For example, a first physical function (PF1) may be associated with the PCIe bus 222, and a second physical function (PF2) may be associated with the PCIe bus 224. Each of the PF1 and the PF2 may expose one or more corresponding VFs on the I/O device 204. For example, a PF device driver 220 executing in the hypervisor 214 may expose a first virtual function (VF1) associated with the PF1, and a second virtual function (VF2) associated with the PF2. Each of the VF1 and VF2 may include their respective configuration space, and I/O memory space for the queues and registers. The PF device driver 220 may map the configuration space, and the I/O memory space associated with each of the VF1 and the VF2 to the address space allocated to the VM 212. The PF device driver 220 may bind the PF1 and the VF1 to the first PCI bus 222, and the PF2 and the VF2 to the second PCI bus 224 using configurations associated with the first PCI bus 222 and the second PCI bus 224.

In some embodiments, both the IOMMU1 206 and the IOMMU2 208 may be configured to map VF1 device addresses and VF2 device addresses, respectively, for DMA transactions and MSIs-X to the address space allocated to the VM 212 for the system memory 210. The DMA transactions may be performed to transfer data to or from the system memory 210 without the involvement of the host processor 202 for the ingress traffic or the egress traffic of the I/O device 204. For example, the ingress traffic may include packets received by the I/O device 204 from an external entity that need to be stored in the system memory 210, and the egress traffic may include packets transmitted by the I/O device 204 from the system memory 210 to an external entity.

Some embodiments can assign a single VF associated with the VM 212 to multiple PCIe ports of the I/O device 204 to enable the VM 212 to utilize the bandwidth of each of those PCIe ports. For example, each PCIe port may be associated with a VF, and the I/O memory space for each VF associated with a corresponding PCIe port can be mapped to the address space allocated to the VM 212, however; only a single VF is exposed to the guest OS 216 or a VF device driver 218. This is further explained with reference to FIG. 3.

Figure 3:
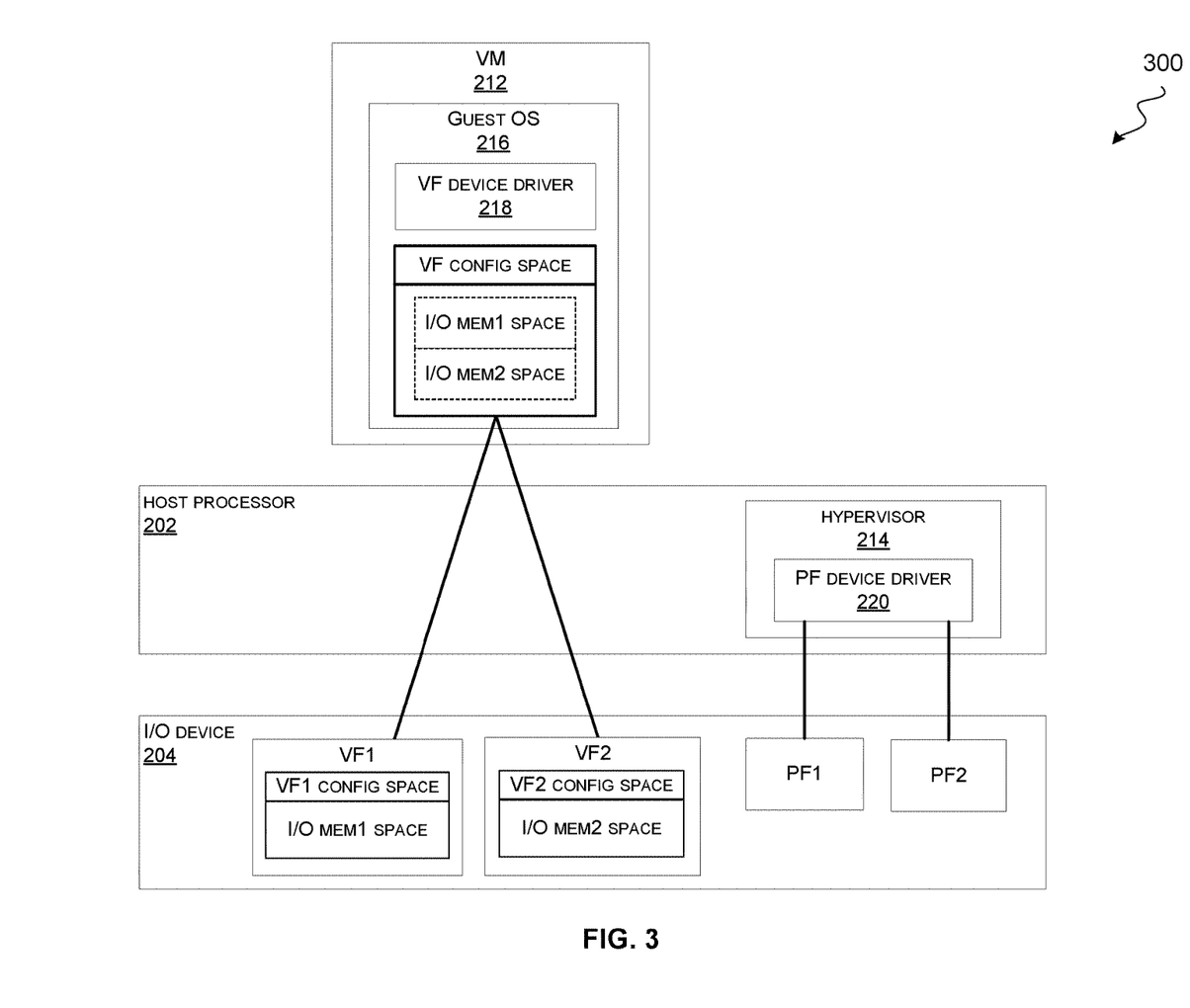
FIG. 3 illustrates an example mapping of multiple virtual functions that are associated with different physical functions to the same VM as a single virtual function, according to some embodiments.

FIG. 3 illustrates an example mapping 300 of multiple VFs that are associated with different PFs to the same VM as a single VF, according to some embodiments.

As shown in FIG. 3, an address space allocated to the VM 212 may be mapped to a configuration space (VF config space) and an I/O memory (mem) space comprising an I/O mem1 space and an I/O mem2 space for a single VF. In some embodiments, the PF device driver 220 may assign the I/O mem1 space to the VF1, and the I/O mem2 space to the VF2. The PF device driver 220 may also mirror configurations applied to a first configuration space associated with the VF1 (VF1 config space) to a second configuration space associated with the VF2 (VF2 config space) that are presented as the VF config space associated with the single VF. In some examples, mirroring the configurations applies similar configurations to both VF1 and VF2 to enable identical behavior in both VFs such that they appear as the same device to the VM even though they include separate requester IDs, or other configurations for the specific peripheral bus associated with that VF.

The IOMMU1 206 and the IOMMU2 208 may be configured to translate virtual addresses to physical addresses that correspond to the memory space allocated to the VM 212 in the system memory 210 for DMA transactions between the I/O device 204 and the system memory 210 that are performed using both the PCIe buses 222 and 224. Similarly, the IOMMU1 206 and the IOMMU2 208 may be configured to translate the MSIs-X for both the VF1 and the VF2 to trigger the same interrupt on the VM 212 for the single VF. Thus, the guest OS 216 and/or the VF device driver 218 may manage data transfers between the VM 212 and the I/O device 204 using the VF config space and the I/O mem space assigned to the single VF, without the knowledge of the split accesses by the VF1 and VF2. In some examples the data transfer traffic can be split between the two PCI buses 222 and 224 to provide higher bandwidth. This is explained with reference to an I/O device 400 in FIG. 4.

Figure 4:
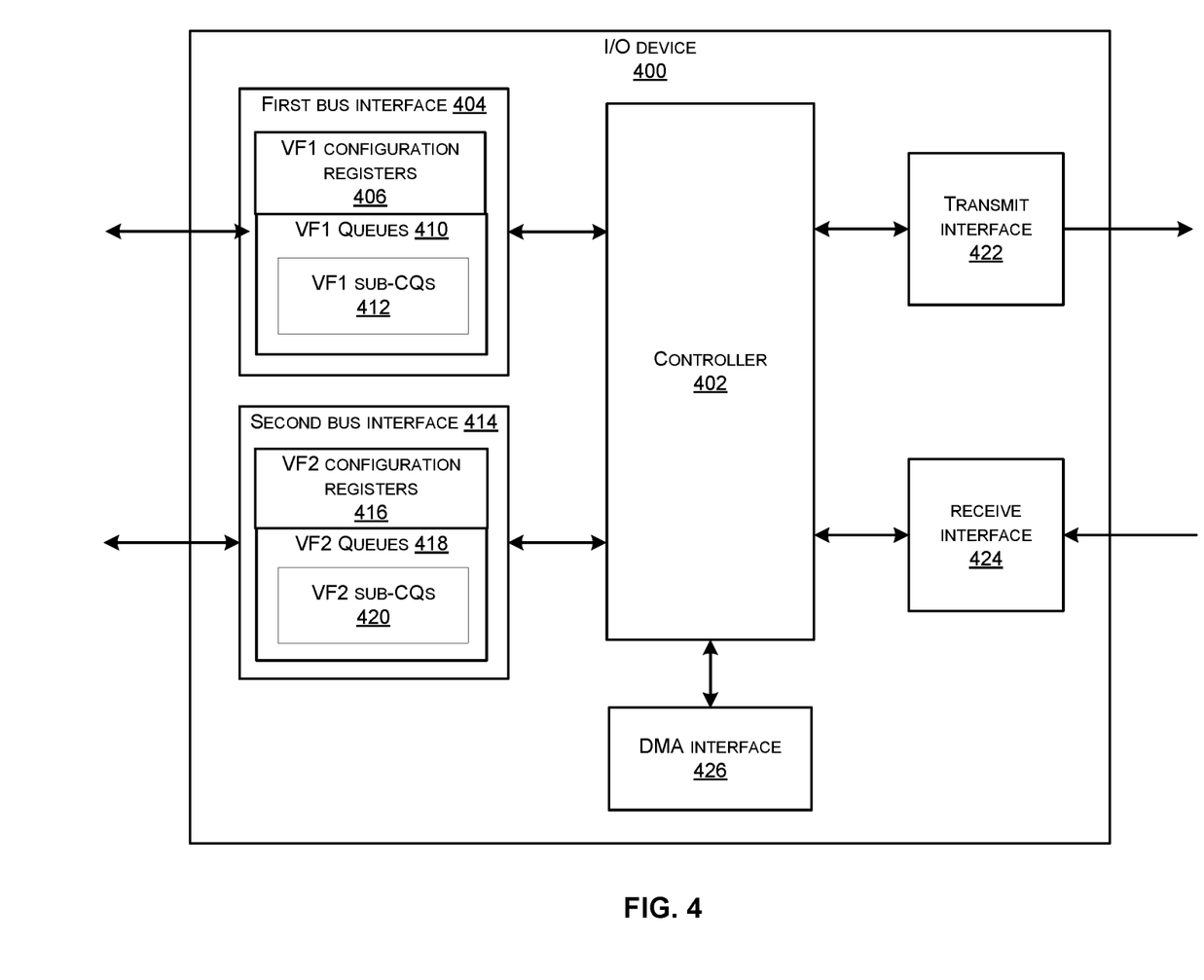
FIG. 4 illustrates an example I/O device that can provide higher bandwidth for data transfers using multiple peripheral ports bonded to a single virtual function, according to some embodiments.

FIG. 4 illustrates an example I/O device 400 that can provide higher bandwidth for data transfers using multiple peripheral ports bonded to a single VF, according to some embodiments. The I/O device 400 can be an example of the I/O device 204.

The I/O device 400 may include a controller 402 that is coupled to a first bus interface 404, a second bus interface 414, a transmit interface 422, a receive interface 424, and a DMA interface 426. In some implementations, the controller 402 may include a microcontroller or a processor that can be configured to execute firmware or software to perform certain operations. In various examples, the I/O device 400 can be a network device (e.g., Ethernet controller), or a memory controller for an NVMe device (e.g., flash, solid state drive, etc.), and can include additional components to support the intended functionality.

The first bus interface 404 may be used to communicate with a host processor via a first peripheral bus, and the second bus interface 414 may be used to communicate with the host processor via a second peripheral bus. As an example, the first peripheral bus can be the first PCIe bus 222, and the second peripheral bus can be the second PCIe bus 224. The first bus interface 404 may be configured to provide an interface to the first PCIe bus 222, and the second bus interface 414 may be configured to provide an interface to the second PCIe bus 224. The first bus interface 404 may include VF1 configuration registers 406 and VF1 queues 410 associated with the VF1. The second bus interface 414 may include VF2 configuration registers 416 and VF2 queues 418 associated with the VF2. Referring back to FIG. 3, the VF1 configuration registers 406 and the VF2 configuration registers 416 can be examples of the VF1 config space associated with the VF1, and the VF2 config space associated with the VF2, respectively. The VF1 configuration registers 406 and the VF2 configuration registers 416 can be programmed to enable identical behavior for both the VF1 and the VF2 towards the VM, such that the VF1 and VF2 appear as the same device to the VM. The VF1 queues 410 may be part of the I/O mem1 space, and the VF2 queues 418 may be part of the I/O mem2 space.

In some examples, the I/O device 400 can be an Ethernet controller that is configured to provide a network interface to the host processor 202 using Ethernet ports. For example, the transmit interface 422 may include transmission (TX) ports, TX buffers, media access control (MAC) module, and other suitable circuitry to transmit network packets to a remote device via the network. The receive interface 424 may include receive (RX) ports, RX buffers, MAC module, and other suitable circuitry to receive network packets from a remote device via the network, that can be written into the system memory 210.

In some implementations, each of the VF1 queues 410 and the VF2 queues 418 may include a respective set of ingress queues and egress queues. The egress queues can be used to store read descriptors for transactions initiated by the VM 212 to read the system memory 210 to obtain data for packet generation and transmission to a remote device via the transmit interface 422. The ingress queues can be used to store write descriptors for transactions to write data into the system memory 210 for the network packets received via the receive interface 424 from the remote device. In some implementations, the write descriptors and the read descriptors can be used to transfer the data using the DMA interface 426. In various examples, the DMA interface 426 may be operable to perform remote DMA (RDMA), or ultra DMA (UDMA).

In various embodiments, the network traffic can be distributed over multiple queues to be transferred over both the first PCIe bus 222 and the second PCIe bus 224 to achieve maximum performance (e.g., bandwidth and packets-per-second (PPS)). For example, since the VF1 queues 410 are assigned to the first PCIe bus 222, and the VF2 queues 418 are assigned to the second PCIe bus 224, the network traffic can be distributed over the first PCI bus 222 and the second PCIe bus 224 by placing the packets in the appropriate VF1 queues 410 and the VF2 queues 418, respectively.

For example, for egress traffic, the egress queues in the VF1 queues 410 can be configured to receive a portion of payload data associated with a read transaction via the first PCIe bus 222, and the egress queues in the VF2 queues 418 can be configured to receive a remaining portion of the payload data associated with the read transaction via the second PCIe bus 224. In some implementations, multiple read transactions can be performed to read the payload data for one or more packets in smaller chunks over both the PCIe buses 222 and 224 to utilize the higher bandwidth with 2 PCIe buses. Since the VF1 queues 410 and the VF2 queues 418 are associated with the first PCIe bus 222 and the second PCIe bus 224, respectively, the ordering of the read response can be maintained by the controller 402, and as such, there is no ordering constraints for the egress traffic. Thus, the payload data can be read from the system memory 210 via the first PCIe bus 222 and the second PCIe bus 224 based on any suitable criteria, such as, RX buffer address, Ethernet port to be used for transmission, corresponding queues, etc.

In some implementations, each of the first PCIe bus 222 and the second PCIe bus 224 may be connected to a respective CPU socket with its own memory partition. In this case, the VF1 queues 410 and the VF2 queues 418 can be configured so that the payload data for each half of the packets can be read via the PCIe bus that is closer to the partition of the system memory 210 where that half of the data is stored (e.g., similar to a NUMA aware system).

For ingress traffic received by the I/O device 204 over the network, the ingress queues in the VF1 queues 410 and the VF2 queues 418 can be configured to send the data for the received packets to the system memory 210 on the PCIe buses 222 and 224 using a split scheme. As an example, the ingress queues with even indices can send the data for half the packets on the first PCIe bus 222, and the ingress queues with odd indices can send the data for the other half on the second PCIe bus 224. In some examples, the split scheme may include applying a hash function to the header fields of each packet (e.g., destination address) in the ingress traffic to route that packet to the first PCIe bus 222 or to the second PCIe bus 224. In some examples, the I/O device 204 can be a network device, and half the packets sent via the first PCIe bus 222 are received via network on a first Ethernet port of the I/O device 204, and the other half of the packets sent via the second PCIe bus 224 are received via the network on a second Ethernet port of the I/O device 204.

In some embodiments, each of the VF1 queues 406 and the VF2 queues 408 may include a set of sub-completion queues (CQs) that correspond to the completion queue in the host memory. VF1 sub-CQs 412 may store completion descriptors to track the status of read/write operations associated with the read/write descriptors in the VF1 queues 410, VF2 sub-CQs 420 may store completion descriptors to track the status of read/write operations associated with the read/write descriptors in the VF2 queues 418. The VF1 sub-CQs 412 may be associated with the first PCIe bus 222 and the VF2 sub-CQs 420 may be associated with the second PCIe bus 224. In some examples, when a packet is received for the ingress traffic, it can be sent out on one of the PCIe buses 222, 224 to be written into the system memory 210, and a completion or notification message corresponding to the write transaction can be stored in the sub-CQs associated with that PCIe bus. For example, if a packet is sent out on the first PCIe bus 222, the controller 402 can write the completion message using the VF1 sub-CQs 412, and if a packet is sent out on the second PCIe bus 224, the controller 402 can write the completion message using the VF2 sub-CQs 420. Thus, no ordering of packets may be needed in this case as long as the completion messages can be stored in the corresponding sub-CQs.

In some embodiments, the VF1 configuration registers 406 may include a first set of registers assigned to MSIs-X associated with the VF1, and the VF2 configuration registers 416 may include a second set of registers assigned to MSIs-X associated with the VF2. For example, an MSI-X can be generated for the VF1 once the DMA transfers on the first PCI bus 222 are completed, and an MSI-X can be generated for the VF2 once the DMA transfers on the second PCI bus 224 are completed. In some embodiments, MSIs-X can also be mirrored, such that the same entry on both VFs will trigger same interrupt to the VM 212. For example, writing to the same MSI-X register in both the first set of registers and the second set of registers can trigger the same interrupt for the VM 212. Thus, for the ingress traffic, by binding each VF queue to a specific PCIe bus can ensure that the traffic, the completion message, and the interrupt can follow the same physical path or the PCIe bus, which can maintain the transaction ordering inherently.

Figure 5:
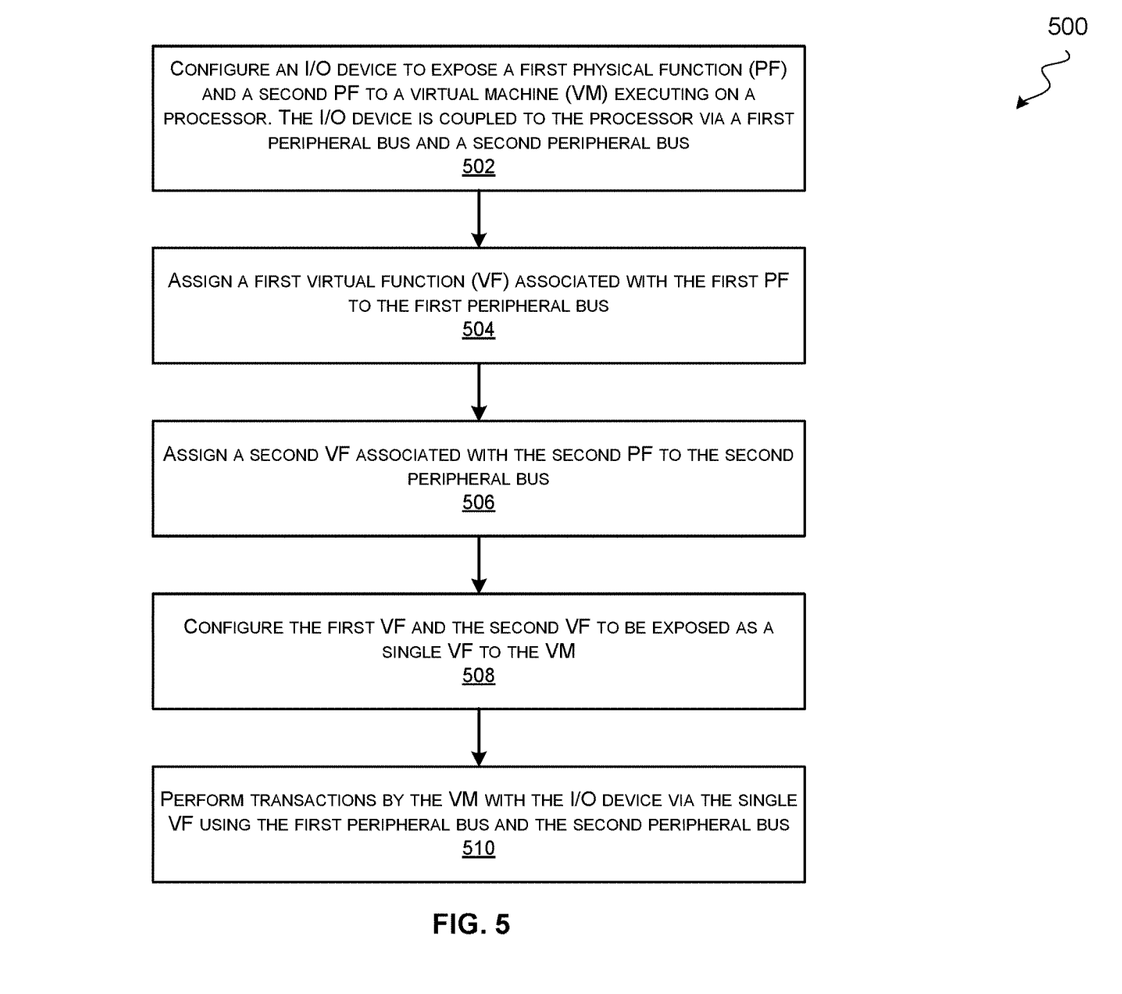
FIG. 5 illustrates an example flowchart for a method that can be performed by a processor to perform transactions with an SR-IOV capable I/O device via a single virtual function using multiple peripheral buses, according to some embodiments.

FIG. 5 illustrates an example flowchart 500 for a method that can be performed by a processor to perform transactions with an SR-IOV capable I/O device via a single VF using multiple peripheral buses, according to some embodiments. The processor can be the host processor 202 in FIG. 2. The peripheral buses may be based on any suitable bus protocol, e.g., PCIe, or CXL, among others.

In step 502, the method includes configurating an I/O device to expose a first PF (PF1) and a second PF (PF2) to a VM executing on the processor. The I/O device is coupled to the processor via a first peripheral bus and a second peripheral bus. For example, the I/O device can be the I/O device 204 coupled to the host processor 202 via the first PCIe bus 222 using the first bus interface 404, and via the second PCIe bus 224 using the second bus interface 414. As shown in FIG. 3, the PF device driver 220 executing in the hypervisor 214 can expose the PF1 and the PF2 to the VM 212 executing on the host processor 202.

In step 504, the method includes assigning a first VF (VF1) associated with the first PF to the first peripheral bus. The PF device driver 220 can assign the VF1 to the first PCIe bus 222. The I/O memory space of the VF1 (e.g., I/O mem1 space) can be mapped to the address space of the VM 212.

In step 506, the method includes assigning a second VF associated with the second PF to the second peripheral bus. The PF device driver 220 can assign the VF2 to the second PCIe bus 224. The I/O memory space of the VF2 (e.g., I/O mem2 space) can be mapped to the address space of the VM 212.

In step 508, the method includes configuring the first VF and the second VF to be exposed as a single VF to the VM. The PF device driver 220 can mirror the configurations by applying similar configurations to both the VF1 configuration registers 406 and the VF2 configuration registers 416 that are presented as a single VF configuration to the VM 212, and can enable identical behavior by both the first VF and the second VF towards the VM 212. The VF1 configuration registers 406 and the VF2 configuration registers 416 may be mapped to the address space of the VM 212 that are presented to the VM 212 as the VF config space.

In step 510, the method includes performing transactions by the VM with the I/O device via the single VF using the first peripheral bus and the second peripheral bus. The VF device 218 can configure the VF1 queues 410 and the VF2 queues 418 to perform the transactions with the I/O device 204 using the first PCIe bus 222 and the second PCIe bus 224.

In some examples, performing the transactions may include configuring ingress queues in the VF1 queues 410 to send, via the first PCIe bus 222, first payload data for a first set of packets received by the I/O device 204 for the ingress traffic, and configuring ingress queues in the VF2 queues 418 to send, via the second PCIe bus 224, second payload data for a second set of packets received by the I/O device 204 for the ingress traffic. The first payload data and the second payload data are written in a memory space allocated to the VM 212 in the system memory 210 at physical addresses associated with the memory space allocated to the VM 212. The physical addresses for writing the payload data or for generating the MSIs-X are translated from virtual addresses associated with the VF1 and the VF2 by the IOMMU1 206 and the IOMMU2 208, respectively.

In some examples, the I/O device can be a network device comprising multiple Ethernet ports to communicate with a remote device via network. The first set of packets sent via the first PCIe bus 222 are the packets received via the network on a first Ethernet port of the I/O device 204, and the second set of packets sent via the second PCIe bus 224 are the packets received via the network on a second Ethernet port of the I/O device 204.

In some examples, the performing the transactions by the VM 212 may further include configuring sub-CQs in the VF1 queues 410 to send completion messages on the first PCIe bus 222 corresponding to the first set of packets sent via the ingress queues in the VF1 queues 410, and configuring sub-CQs in the VF2 queues 418 to send completion messages on the second PCIe bus 224 corresponding to the second set of packets sent via the ingress queues in the VF2 queues 418.

In some examples, performing the transactions by the VM 212 may further include configuring egress queues in the VF1 queues 410 to receive a portion of payload data associated with a read transaction via the first PCIe bus 222, and configuring egress queues in the VF2 queues 418 to receive a remaining portion of the payload data associated with the read transaction via the second PCIe bus 224. The read transaction is performed to read the payload data from a memory space allocated to the VM 212 in the system memory 210 to transmit one or more packets by the I/O device 204 for the egress traffic. The payload data is read from the memory space at physical addresses associated with the memory space that are translated from virtual addresses associated with the VF1 and the VF2 by the IOMMU1 206 and the IOMMU2 208, respectively.

Techniques described herein can be used to achieve higher bandwidth for I/O transactions using multiple peripheral buses by bonding the VFs in the I/O device to corresponding peripheral buses, and exposing the VFs as a single VF to the VM without the knowledge of guest OS or the VF device driver. Thus, the guest OS and the VF device driver do not need to be modified to achieve higher bandwidth using multiple peripheral buses. Note that the method described with reference to FIG. 5 can be executed to perform transactions with any SR-IOV capable device, which can include Ethernet controllers, NVMe storage devices, or hardware accelerators, within the scope of the disclosed technologies.

Figure 6:
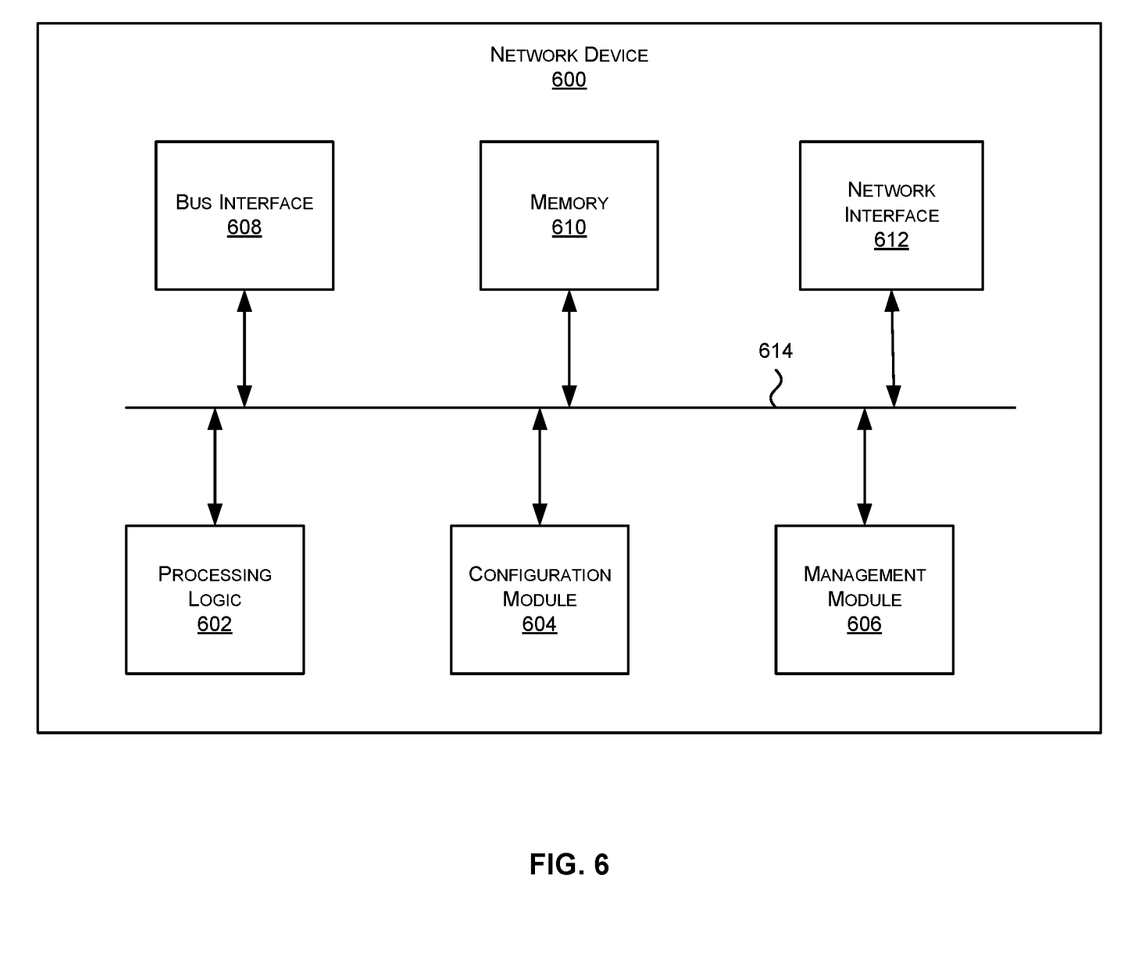
FIG. 6 illustrates an example of a network device, according to certain aspects of the disclosure.

FIG. 6 illustrates an example of a network device 600. Functionality and/or several components of the network device 600 may be used without limitation with other embodiments disclosed elsewhere in this disclosure, without limitations. For example, the network device 600 can be an example of the I/O device 204 or the I/O device 400. A network device 600 may facilitate processing of packets and/or forwarding of packets from the network device 600 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the network device 600 may be the recipient and/or generator of packets. In some implementations, the network device 600 may modify the contents of the packet before forwarding the packet to another device. The network device 600 may be a peripheral device coupled to another computer device, a switch, a router or any other suitable device enabled for receiving and forwarding packets.

In one example, the network device 600 may include processing logic 602, a configuration module 604, a management module 606, a bus interface module 608, memory 610, and a network interface module 612. These modules may be hardware modules, software modules, or a combination of hardware and software. In certain instances, modules may be interchangeably used with components or engines, without deviating from the scope of the disclosure. The network device 600 may include additional modules, which are not illustrated here. In some implementations, the network device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 610 may be internal to the network device 600, while in other cases some or all of the memory may be external to the network device 600. The memory 610 may store an operating system comprising executable instructions that, when executed by the processing logic 602, provides the execution environment for executing instructions providing networking functionality for the network device 600. The memory may also store and maintain several data structures and routing tables for facilitating the functionality of the network device 600.

In some implementations, the configuration module 604 may include one or more configuration registers. Configuration registers may control the operations of the network device 600. In some implementations, one or more bits in the configuration register can represent certain capabilities of the network device 600. Configuration registers may be programmed by instructions executing in the processing logic 602, and/or by an external entity, such as a host device, an operating system executing on a host device, and/or a remote device. The configuration module 604 may further include hardware and/or software that control the operations of the network device 600.

In some implementations, the management module 606 may be configured to manage different components of the network device 600. In some cases, the management module 606 may configure one or more bits in one or more configuration registers at power up, to enable or disable certain capabilities of the network device 600. In certain implementations, the management module 606 may use processing resources from the processing logic 602. In other implementations, the management module 606 may have processing logic similar to the processing logic 602, but segmented away or implemented on a different power plane than the processing logic 602.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the network device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the network device 600 may include multiple network interface modules, each configured to communicate with a different network. For example, in these implementations, the network device 600 may include a network interface module for communicating with a wired Ethernet network, a wireless 802.11 network, a cellular network, an Infiniband network, etc.

The various components and modules of the network device 600, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

In some implementations, the network device 600 is a peripheral device, such as a PCI-based device. In these implementations, the network device 600 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module 608 may implement NVMe, and the network device 600 may be connected to a computing system using a PCIe interface.

A PCI-based device may include one or more functions. A "function" describes operations that may be provided by the network device 600. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 600 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method executed by a processor comprising:
    configuring an input/output (I/O) device to expose a first physical function (PF) and a second PF to a virtual machine (VM) executing on the processor, the I/O device coupled to the processor via a first peripheral bus and a second peripheral bus;
    assigning a first virtual function (VF) associated with the first PF to the first peripheral bus;
    assigning a second VF associated with the second PF to the second peripheral bus;
    configuring the first VF and the second VF to be exposed as a single VF to the VM; and
    performing transactions by the VM with the I/O device via the single VF using the first peripheral bus and the second peripheral bus.

2. The method of claim 1, wherein a first I/O memory space allocated to the first VF in the I/O device, and a second I/O memory space allocated to the second VF in the I/O device are mapped to an address space allocated to the VM.

3. The method of claim 2, wherein the first I/O memory space allocated to the first VF includes a first set of queues that are associated with the first peripheral bus, and the second I/O memory space allocated to the second VF includes a second set of queues that are associated with the second peripheral bus.

4. The method of claim 3, wherein performing the transactions by the VM includes:
    configuring ingress queues in the first set of queues to send, via the first peripheral bus, first payload data for a first set of packets received by the I/O device for ingress traffic; and
    configuring ingress queues in the second set of queues to send, via the second peripheral bus, second payload data for a second set of packets received by the I/O device for the ingress traffic.

5. The method of claim 4, wherein the first payload data and the second payload data are written in a memory space allocated to the VM in a system memory at physical addresses associated with the memory space allocated to the VM, wherein the physical addresses are translated from virtual addresses associated with the first VF and the second VF by a first I/O memory management unit (IOMMU) coupled to the first peripheral bus and a second IOMMU coupled to the second peripheral bus, respectively.

6. The method of claim 4, wherein the ingress traffic is split on the first peripheral bus and the second peripheral bus based on a split scheme that includes applying a hash function to header fields of each packet in the first set of packets and the second set of packets.

7. The method of claim 4, wherein the I/O device is a network device, and wherein the first set of packets sent via the first peripheral bus is received via a network on a first Ethernet port of the I/O device, and the second set of packets sent via the second peripheral bus is received via the network on a second Ethernet port of the I/O device.

8. The method of claim 4, wherein performing the transactions by the VM further includes:
    configuring sub-completion queues in the first set of queues to send completion messages on the first peripheral bus corresponding to the first set of packets sent via the ingress queues in the first set of queues; and
    configuring sub-completion queues in the second set of queues to send completion messages on the second peripheral bus corresponding to the second set of packets sent via the ingress queues in the second set of queues.

9. The method of claim 3, wherein performing the transactions by the VM includes:
    configuring egress queues in the first set of queues to receive a portion of payload data associated with a read transaction via the first peripheral bus; and
    configuring egress queues in the second set of queues to receive a remaining portion of the payload data associated with the read transaction via the second peripheral bus,
    wherein the read transaction is performed to read the payload data from a memory space allocated to the VM in a system memory to transmit one or more packets by the I/O device for egress traffic.

10. The method of claim 1, wherein virtual addresses and interrupts associated with the first VF and the second VF are mapped to the VM by a first IOMMU coupled to the first peripheral bus and a second IOMMU coupled to the second peripheral bus, respectively.

11. The method of claim 1, wherein configuring the first VF and the second VF to be exposed as the single VF to the VM includes mirroring configurations between a first set of configuration registers assigned to the first VF in an address space allocated to the VM, and a second set of configuration registers assigned to the second VF in the address space allocated to the VM.

12. The method of claim 11, wherein the first set of configuration registers includes a first set of registers assigned to message-signaled interrupts associated with the first VF, and the second set of configuration registers includes a second set of registers assigned to message-signaled interrupts associated with the second VF, and wherein the first set of registers and the second set of registers are configured to generate same message signaled interrupts to the VM.

13. A computing system, comprising:
    a host processor configured to execute a virtual machine (VM) and allocate an address space to the VM;
    a network device coupled to the host processor via a first peripheral component interconnect express (PCIe) bus and a second PCIe bus, the network device having a single-root input/output virtualization (SR-IOV) capability to expose multiple functions comprising physical functions (PFs), and one or more virtual functions (VFs) associated with each PF;
    a first input/output memory management unit (IOMMU) coupled to the network device via the first PCIe bus; and a second IOMMU coupled to the network device via the second PCIe bus, wherein the host processor is operable to:
configure the network device to expose a first physical function (PF) and a second PF to the VM;
assign a first VF associated with the first PF to the first PCIe bus;
assign a second VF associated with the second PF to the second PCIe bus; and
configure the first VF and the second VF to be exposed as a single VF to the VM, and wherein the VM is operable to:
perform transactions with the network device via the single VF using the first PCIe bus and the second PCIe bus.

14. The computing system of claim 13, wherein the network device comprises:
a first set of queues associated with the first VF that are mapped to the address space allocated to the VM, wherein the first IOMMU is configured to translate virtual addresses of transactions processed by the first set of queues to physical addresses corresponding to a memory space allocated to the VM in a system memory; and
a second set of queues associated with the second VF that are mapped to the address space allocated to the VM, wherein the second IOMMU is configured to translate virtual addresses of transactions processed by the second set of queues to physical addresses corresponding to the memory space allocated to the VM in the system memory.

15. The computing system of claim 14, wherein the first set of queues are configured to send payload data, completion messages, and message-signaled interrupts associated with the first VF on the first PCIe bus, and the second set of queues are configured to send payload data, completion messages, and message-signaled interrupts associated with the second VF on the second PCIe bus.

16. The computing system of claim 13, wherein configuring the first VF and the second VF to be exposed as the single VF to the VM includes mirroring configurations between a first set of configuration registers in the network device that are assigned to the first VF in the address space allocated to the VM, and a second set of configuration registers in the network device that are assigned to the second VF in the address space allocated to the VM to enable identical behavior by both the first VF and the second VF towards the VM.

17. An input/output (I/O) device comprising:
a first peripheral bus interface to communicate with a host processor via a first peripheral bus, the first peripheral bus assigned to a first physical function (PF), and to a first virtual function (VF) associated with the first PF, wherein a first I/O memory space is allocated to the first VF;
a second peripheral bus interface to communicate with the host processor via a second peripheral bus, the second peripheral bus assigned to a second PF, and to a second VF associated with the second PF, wherein a second I/O memory space is allocated to the second VF, and wherein the first I/O memory space and the second I/O memory space are mapped to an address space allocated to a virtual machine (VM) executing on the host processor;
a first set of configuration registers assigned to the first VF in the address space of the VM;
a second set of configuration registers assigned to the second VF in the address space of the VM, wherein the first set of configuration registers and the second set of configuration registers are mirrored to expose the first VF and the second VF as a single VF to the VM;
a first set of queues assigned to the first VF in the first I/O memory space, wherein the first set of queues are used perform data transfer with a system memory via the first peripheral bus; and
a second set of queues assigned to the second VF in the second I/O memory space, wherein the second set of queues are used to perform data transfers with the system memory via the second peripheral bus.

18. The I/O device of claim 17, wherein
ingress queues in the first set of queues are configured to send, via the first peripheral bus, first payload data for a first set of packets received by the I/O device for ingress traffic, wherein the first payload data is written in the system memory at physical addresses that are associated with a memory space allocated to the VM, wherein the physical addresses are translated from virtual addresses associated with the first VF by a first I/O memory management unit (IOMMU) coupled to the first peripheral bus, and
ingress queues in the second set of queues are configured to send, via the second peripheral bus, second payload data for a second set of packets received by the I/O device for the ingress traffic, wherein the second payload data is written in the system memory at physical addresses that are associated with the memory space allocated to the VM, wherein the physical addresses are translated from virtual addresses associated with the second VF by a second IOMMU coupled to the second peripheral bus.

19. The I/O device of claim 18, wherein
sub-completion queues in the first set of queues are configured to send completion messages on the first peripheral bus corresponding to the first set of packets sent via the ingress queues in the first set of queues, and
sub-completion queues in the second set of queues are configured to send completion messages on the second peripheral bus corresponding to the second set of packets sent via the ingress queues in the second set of queues.

20. The I/O device of claim 17, wherein
egress queues in the first set of queues are configured to receive a portion of payload data associated with a read transaction via the first peripheral bus, and
egress queues in the second set of queues are configured to receive a remaining portion of the payload data associated with the read transaction via the second peripheral bus, and
wherein the read transaction is performed to read the payload data from a memory space allocated to the VM in the system memory to transmit one or more packets by the I/O device for egress traffic.

21. The I/O device of claim 17, wherein the first peripheral bus and the second peripheral bus are based on peripheral component interconnect express (PCIe) protocol or compute express link (CXL) protocol.

* * * * *